United States Patent
Nakamura et al.

(10) Patent No.: US 11,923,726 B2
(45) Date of Patent: Mar. 5, 2024

(54) STATOR CORE, ROTATING ELECTRIC DEVICE, AND STATOR CORE MANUFACTURING METHOD

(71) Applicants: SUMITOMO ELECTRIC INDUSTRIES, LTD., Osaka (JP); SUMITOMO ELECTRIC SINTERED ALLOY, LTD., Takahashi (JP)

(72) Inventors: Yuuichi Nakamura, Osaka (JP); Tomoyuki Ueno, Osaka (JP); Tatsuya Saito, Osaka (JP)

(73) Assignees: SUMITOMO ELECTRIC INDUSTRIES, LTD., Osaka (JP); SUMITOMO ELECTRIC SINTERED ALLOY, LTD., Takahashi (JP)

( * ) Notice: Subject to any disclaimer, the term of this patent is extended or adjusted under 35 U.S.C. 154(b) by 485 days.

(21) Appl. No.: 17/273,125

(22) PCT Filed: Sep. 5, 2019

(86) PCT No.: PCT/JP2019/034956
§ 371 (c)(1),
(2) Date: Mar. 3, 2021

(87) PCT Pub. No.: WO2020/059517
PCT Pub. Date: Mar. 26, 2020

(65) Prior Publication Data
US 2021/0344237 A1    Nov. 4, 2021

(30) Foreign Application Priority Data

Sep. 18, 2018 (JP) ................................ 2018-173486

(51) Int. Cl.
| | |
|---|---|
| H02K 1/02 | (2006.01) |
| H01F 1/24 | (2006.01) |
| H01F 3/08 | (2006.01) |
| H01F 27/255 | (2006.01) |
| H02K 1/14 | (2006.01) |
| H02K 21/24 | (2006.01) |

(52) U.S. Cl.
CPC ............... *H02K 1/02* (2013.01); *H01F 1/24* (2013.01); *H01F 3/08* (2013.01); *H01F 27/255* (2013.01); *H02K 1/14* (2013.01); *H02K 21/24* (2013.01)

(58) Field of Classification Search
CPC . H02K 1/02; H02K 1/14; H02K 21/24; H01F 1/24; H01F 3/08; H01F 27/255
(Continued)

(56) References Cited

U.S. PATENT DOCUMENTS

| | | |
|---|---|---|
| 2003/0189386 A1 | 10/2003 | Carl |
| 2010/0275660 A1 | 11/2010 | Yoon et al. |

(Continued)

FOREIGN PATENT DOCUMENTS

| | | | |
|---|---|---|---|
| JP | 2005-269845 A | | 9/2005 |
| JP | 2005269845 A | * | 9/2005 |

(Continued)

OTHER PUBLICATIONS

Watanabe et al., English Machine Translation of JP-2005269845-A (Year: 2005).*

(Continued)

*Primary Examiner* — Rashad H Johnson
(74) *Attorney, Agent, or Firm* — Faegre Drinker Biddle & Reath LLP

(57) ABSTRACT

This stator core is a stator core for a rotating electric machine of an axial gap type and includes a body portion formed by a compaction-molded body of soft magnetic (Continued)

powder whose surfaces are coated with insulating films, wherein the body portion is provided with one or a plurality of through holes.

8 Claims, 8 Drawing Sheets

(58) Field of Classification Search
USPC .......................................................... 310/44
See application file for complete search history.

(56) References Cited

U.S. PATENT DOCUMENTS

2021/0384778 A1* 12/2021 Saito ..................... H02K 1/146
2022/0060066 A1* 2/2022 Saito ..................... H02K 21/24
2022/0181923 A1* 6/2022 Saito ..................... H02K 21/24
2022/0263394 A1* 8/2022 Takahashi .............. H02K 5/225

FOREIGN PATENT DOCUMENTS

| JP | 2008-131784 A | | 6/2008 |
| JP | 2008131784 A | * | 6/2008 |
| JP | 2009-296825 A | | 12/2009 |

OTHER PUBLICATIONS

Asano et al., English Machine Translation of JP-2008131784-A (Year: 2008).*
Watanabe, Asako, et al., "Thin and High-Torque Axial Gap Motor Using Soft Magnetic Powder Cores," Jan. 2018, SEI Technical Review, No. 192, pp. 119-125.

* cited by examiner

STATOR CORE, ROTATING ELECTRIC DEVICE, AND STATOR CORE MANUFACTURING METHOD

TECHNICAL FIELD

The present disclosure relates to a stator core, a rotating electric machine, and a stator core manufacturing method.

This application claims priority on Japanese Patent Application No. 2018-173486 filed on Sep. 18, 2018, the entire content of which is incorporated herein by reference.

BACKGROUND ART

For an axial gap motor in which a gap between a rotor and a stator is provided in the axial direction, attempts to form a stator core by a magnetic powder core have been made (see, for example, Non Patent Literature 1).

CITATION LIST

Non Patent Literature

NON PATENT LITERATURE 1: Asako Watanabe, et al., "Thin and High-Torque Axial Gap Motor Using Soft Magnetic Powder Cores", January 2018, SEI technical review, No. 192, pp. 119-125

SUMMARY OF INVENTION

A stator core according to an embodiment is a stator core for a rotating electric machine of an axial gap type, the stator core including a body portion formed by a compaction-molded body of soft magnetic powder whose surfaces are coated with insulating films, wherein the body portion is provided with one or a plurality of through holes.

A stator core according to another embodiment is a stator core for a rotating electric machine of an axial gap type, the stator core including: a body portion formed by a compaction-molded body of soft magnetic powder whose surfaces are coated with insulating films; and one or a plurality of bolts fixed to the body portion, wherein the bolt is fixed such that a screw portion of the bolt protrudes from an outer surface of the body portion and a head portion of the bolt is embedded in the body portion.

A rotating electric machine according to still another embodiment is a rotating electric machine of an axial gap type that includes any of the above stator cores.

A stator core manufacturing method according to still another embodiment is a method for manufacturing a stator core for a rotating electric machine of an axial gap type, the method including: a compaction-molding step of compaction-molding soft magnetic powder whose surfaces are coated with insulating films, to obtain a green compact of the stator core having one or a plurality of through holes, wherein, in the compaction-molding step, the soft magnetic powder is compaction-molded using a mold capable of forming an outer shape of the green compact and the one or plurality of through holes.

DESCRIPTION OF EMBODIMENTS

Figure 1:
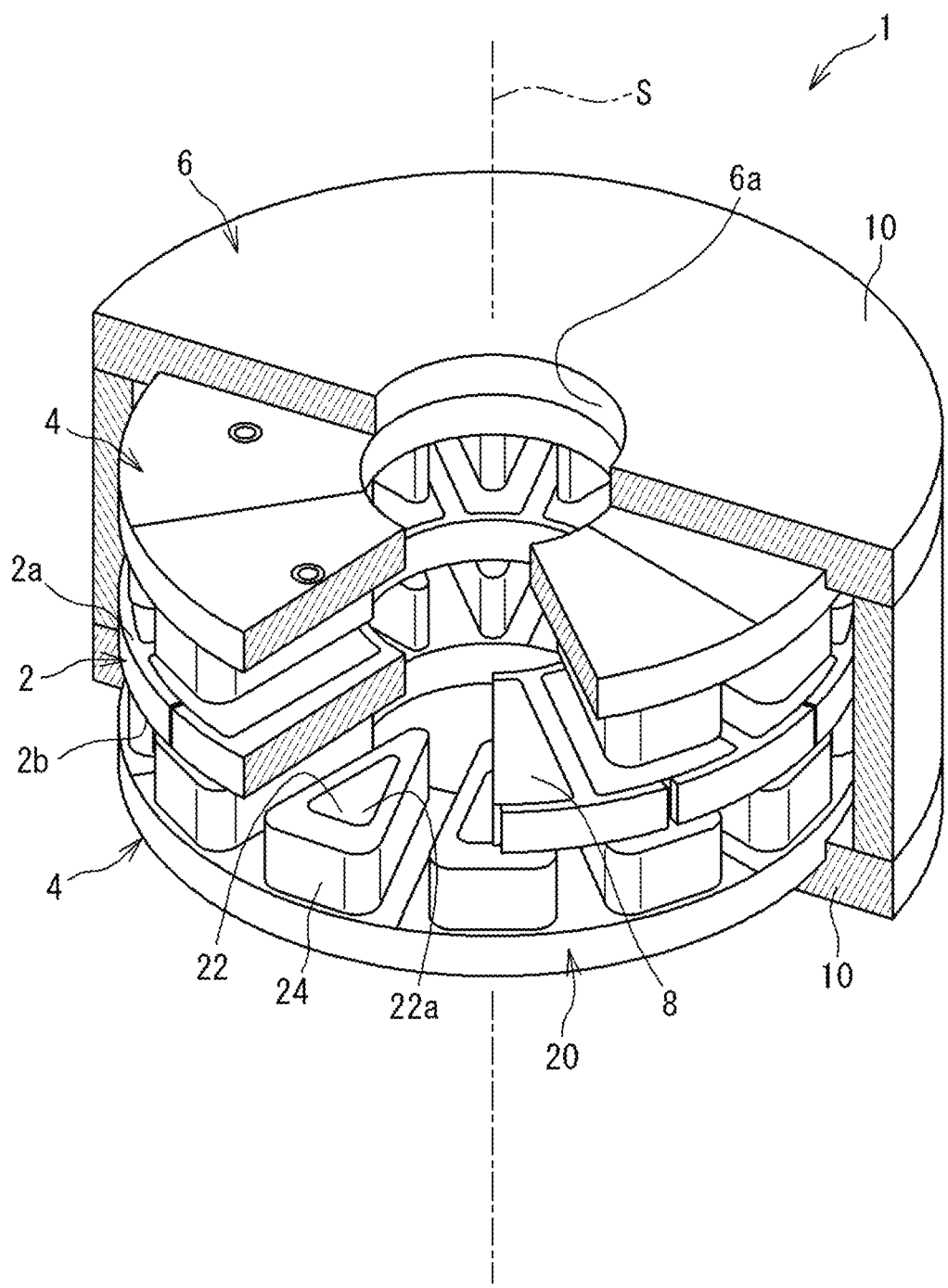
FIG. 1 is a perspective view showing the structure of an axial gap motor according to an embodiment.

Problems to be Solved by the Present Disclosure

A stator core formed by a magnetic powder core needs to be fixed to a surrounding member such as a housing of a motor.

As a fixation method for the stator core formed by the magnetic powder core, it is conceivable that an adhesive layer using an adhesive agent or the like is interposed between the housing and the stator core, for example. Fixation between the housing and the stator core by the adhesive layer is permitted in a trial production or the like, but as an actual product, these are not mechanically fixed and therefore such fixation is not preferable in terms of reliability.

Thus, the stator core formed by the magnetic powder core is desired to be fixed to a surrounding member with higher reliability.

The present disclosure has been made in view of the above circumstances, and an object of the present disclosure is to provide a stator core that can be fixed to a surrounding member with higher reliability.

Effects of the Present Disclosure

The present disclosure makes it possible to make fixation to a surrounding member with higher reliability.

First, the contents of embodiments are listed and described.

Outlines of Embodiments (1) A stator core according to an embodiment is a stator core for a rotating electric machine of an axial gap type, the stator core including a body portion formed by a compaction-molded body of soft magnetic powder whose surfaces are coated with insulating films, wherein the body portion is provided with one or a plurality of through holes.

In the stator core having the above configuration, one or a plurality of through holes are provided in the body portion. Therefore, mechanical elements such as bolts and nuts can be used for fixing the stator core to a surrounding member such as a housing of the rotating electric machine. As a result, it becomes possible to fix the stator core to a surrounding member with higher reliability as compared to fixation using an adhesive layer or the like.

(2) In the above stator core, the body portion may include a plate-shaped yoke having one surface and a back surface crossing an axial direction of the rotating electric machine, and a plurality of tooth portions protruding along the axial direction from the one surface, and the one or plurality of through holes may penetrate along the axial direction from the one surface to the back surface.

In this case, the through hole which might reduce the sectional area of a magnetic path and hamper flow of a magnetic flux is provided in the yoke. Therefore, flow of a magnetic flux in the tooth portion can be appropriately ensured.

(3) In the above stator core, the plurality of tooth portions may be arranged at predetermined intervals along a circumferential direction, and when the one surface is viewed straightly from the axial direction, a part or an entirety of the one through hole or each of the plurality of through holes may be located outside an area between a pair of the tooth portions arranged adjacently to each other among the plurality of tooth portions on the one surface.

In this case, the through hole is provided on an end side of or outside the area between the pair of tooth portions on the one surface. Therefore, it is possible to inhibit the through hole from hampering flow of a magnetic flux passing through the area between the pair of tooth portions in the yoke.

(4) In the above stator core, when the through hole is provided in the yoke, the sectional area of a magnetic path is reduced, so that flow of a magnetic flux in the yoke might be hampered. Therefore, in a cross-section of the yoke along one plane or each of a plurality of planes including an axis of the rotating electric machine and a center line of the one or plurality of through holes, a proportion of a sectional area based on a contour of the one or plurality of through holes in a sectional area based on an outer contour of the yoke can be set to be 50 percent or less.

In this case, the sectional area of the magnetic path can be ensured in a minimum necessary amount. If the proportion of the sectional area based on the contour of the through hole in the sectional area based on the outer contour of the yoke is set to be smaller, a larger sectional area of the magnetic path can be ensured, and thus flow of the magnetic flux in the yoke can be appropriately ensured. Therefore, the proportion of the sectional area based on the contour of the through hole in the sectional area based on the outer contour of the yoke may be 30 percent or less, or may be 10 percent or less.

(5) In the above stator core, the body portion may include a plate-shaped yoke having one surface and a back surface crossing an axial direction of the rotating electric machine, and a plurality of tooth portions protruding along the axial direction from the one surface, and the one or plurality of through holes may penetrate along the axial direction from end surfaces of the plurality of tooth portions to the back surface.

In this case, the through hole is provided in the tooth portion having a larger axial-direction thickness than the yoke. Therefore, reduction in the strength of the body portion due to providing the through hole can be inhibited.

In addition, since the through hole which might reduce the sectional area of the magnetic path and hamper the flow of the magnetic flux is provided in the tooth portion, the flow of the magnetic flux in the yoke can be appropriately ensured.

(6) In the above stator core, when the through hole is provided in the tooth portion, the area of the magnetic path is reduced, so that flow of a magnetic flux in the yoke might be hampered. Therefore, in a cross-section of each tooth portion along a plane crossing an axis of the rotating electric machine, a proportion of a sectional area based on a contour of the one or plurality of through holes in a sectional area based on an outer contour of the tooth portion provided with the one or plurality of through holes can be set to be 50 percent or less.

In this case, the magnetic path can be ensured in a minimum necessary amount.

If the proportion of the sectional area based on the contour of the through hole in the sectional area based on the outer contour of the tooth portion is set to be smaller, a larger sectional area of the magnetic path can be ensured, and thus flow of the magnetic flux in the tooth portion can be appropriately ensured. Therefore, the proportion of the sectional area based on the contour of the through hole in the sectional area based on the outer contour of the tooth portion may be 30 percent or less, or may be 10 percent or less.

(7) In the above stator core, the through hole may have a circular sectional shape or a polygonal sectional shape.

(8) In the above stator core, at least one of both ends of the through hole may be formed to be a stepped hole.

(9) In the above stator core, the through hole may be formed to be a tapered hole.

(10) A stator core according to another embodiment is a stator core for a rotating electric machine of an axial gap type, the stator core including: a body portion formed by a compaction-molded body of soft magnetic powder whose surfaces are coated with insulating films; and one or a plurality of bolts fixed to the body portion, wherein the bolt is fixed such that a screw portion of the bolt protrudes from an outer surface of the body portion and a head portion of the bolt is embedded in the body portion.

In the stator core having the above configuration, one or a plurality of bolts are fixed to the body portion. Therefore, mechanical elements such as nuts can be screwed to a screw portion of the bolt, to fix the stator core to a surrounding member such as a housing of the rotating electric machine. As a result, it becomes possible to fix the stator core to a surrounding member with higher reliability as compared to fixation using an adhesive layer or the like.

(11) A rotating electric machine according to still another embodiment is a rotating electric machine of an axial gap type that includes the stator core described in any one of the above (1) to (6).

(12) A stator core manufacturing method according to still another embodiment is a stator core manufacturing method for manufacturing a stator core for a rotating electric machine of an axial gap type, the method including a compaction-molding step of compaction-molding soft magnetic powder whose surfaces are coated with insulating films, to obtain a green compact of the stator core having one or a plurality of through holes, wherein, in the compaction-molding step, the soft magnetic powder is compaction-molded using a mold capable of forming an outer shape of the green compact and the one or plurality of through holes.

With the manufacturing method having the above configuration, the outer shape of the green compact and the one or plurality of through holes can be formed in the compaction-molding step. Therefore, it is possible to reduce cost and time required for manufacturing, as compared to a case where the outer shape of the green compact is formed and then the through hole is formed by a drill or the like, for example.

(13) In the above manufacturing method, the one or plurality of through holes may be provided with chamfers or fillets at outer ends thereof, and the mold may be capable of forming the one or plurality of through holes provided with the chamfers or the fillets at the outer ends thereof.

Details of Embodiments

Hereinafter, embodiments will be described with reference to the drawings.

At least some parts of the embodiments described below may be combined together as desired.

[Structure of Axial Gap Motor]

FIG. 1 is a perspective view showing the structure of an axial gap motor according to an embodiment. In FIG. 1, a part of the structure is not shown, for the purpose of showing the internal structure.

In FIG. 1, an axial gap motor 1 is a motor in which a gap between a rotor and a stator is provided in the axial direction, and includes a disk-shaped rotor 2, a pair of stators 4 provided on both sides in the axial direction of the rotor 2, and a housing 6 storing these, thus having a so-called double-stator structure.

In FIG. 1, a rotary shaft inserted into a hole portion 6a of the housing 6 and provided rotatably relative to the housing 6, is not shown. It is noted that the axial direction is a direction parallel to an axis S of the rotary shaft.

The rotor 2 includes a plurality of magnets 8 and is fixed to the rotary shaft (not shown) so as to be rotatable integrally therewith.

Figure 2:
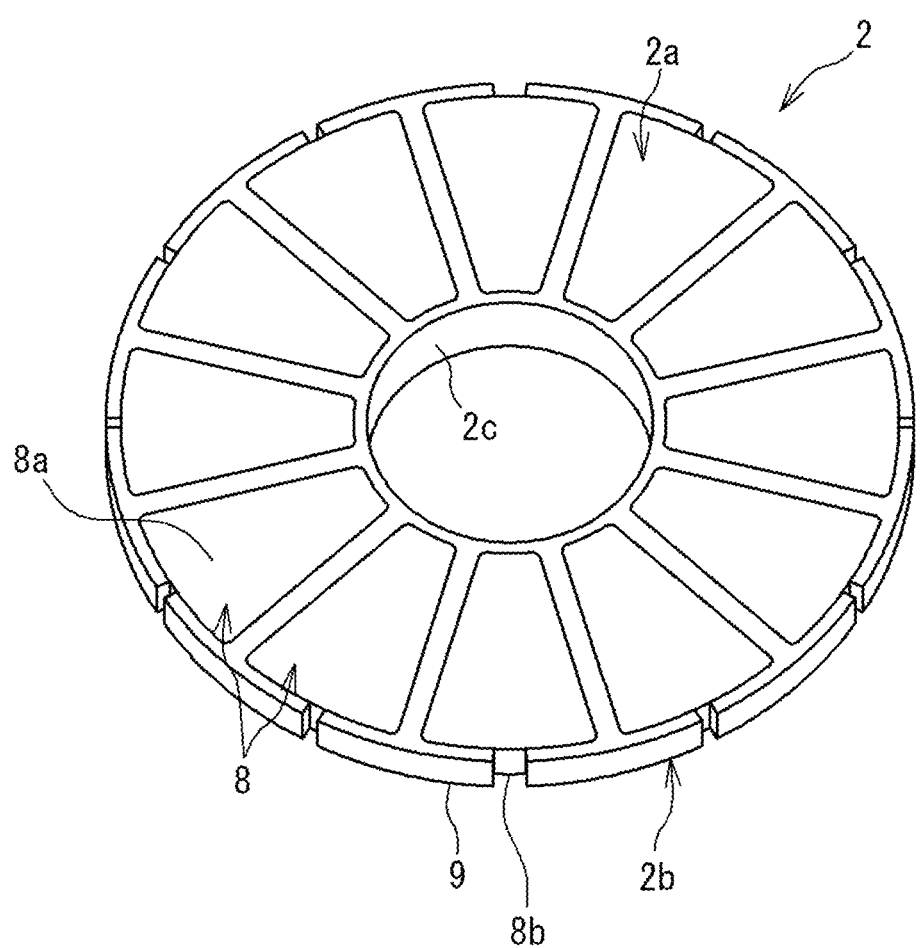
FIG. 2 is an external view of a rotor.

FIG. 2 is an external view of the rotor 2. As shown in FIG. 2, the rotor 2 is formed in an annular plate shape having a hole portion 2c through which the rotary shaft is inserted. The plurality of magnets 8 are held by a holding member 9 made of a non-magnetic material.

The plurality of magnets 8 are each formed in a plate shape. One surface 8a and another surface 8b of each of the plurality of magnets 8 are exposed on one surface 2a and another surface 2b of the rotor 2. The outer shape of each of the plurality of magnets 8 is a sector shape having a small-diameter arc and a large-diameter arc.

The plurality of magnets 8 are arranged in an annular shape along the circumferential direction. Among the plurality of magnets 8, the magnets 8 adjacent to each other are arranged such that magnetic poles of their one surfaces 8a (other surfaces 8b) exposed on the one surface 2a (or other surface 2b) of the rotor 2 are different from each other. That is, magnetic poles of the one surfaces 8a (or other surfaces 8b) of the plurality of magnets 8 exposed on the one surface 2a (or other surface 2b) of the rotor 2 are alternately different along the circumferential direction.

Returning to FIG. 1, the pair of stators 4 are arranged with gaps provided in the axial direction from the one surface 2a and the other surface 2b of the rotor 2. The pair of stators 4 are fixed to a cover 10 (surrounding member) of the housing 6. Thus, the rotor 2 and the pair of stators 4 are configured to be rotatable relative to each other.

Each stator 4 includes a stator core 20, and a plurality of coils 24 wound around a plurality of tooth portions 22 that the stator core 20 has.

End surfaces 22a of the plurality of tooth portions 22 wound with the coils 24 are opposed to the one surface 2a (other surface 2b) of the rotor 2. The gap is formed between the end surfaces 22a of the plurality of tooth portions 22 and the one surface 2a (other surface 2b) of the rotor 2.

[Stator Core According to First Embodiment]

Figure 3:
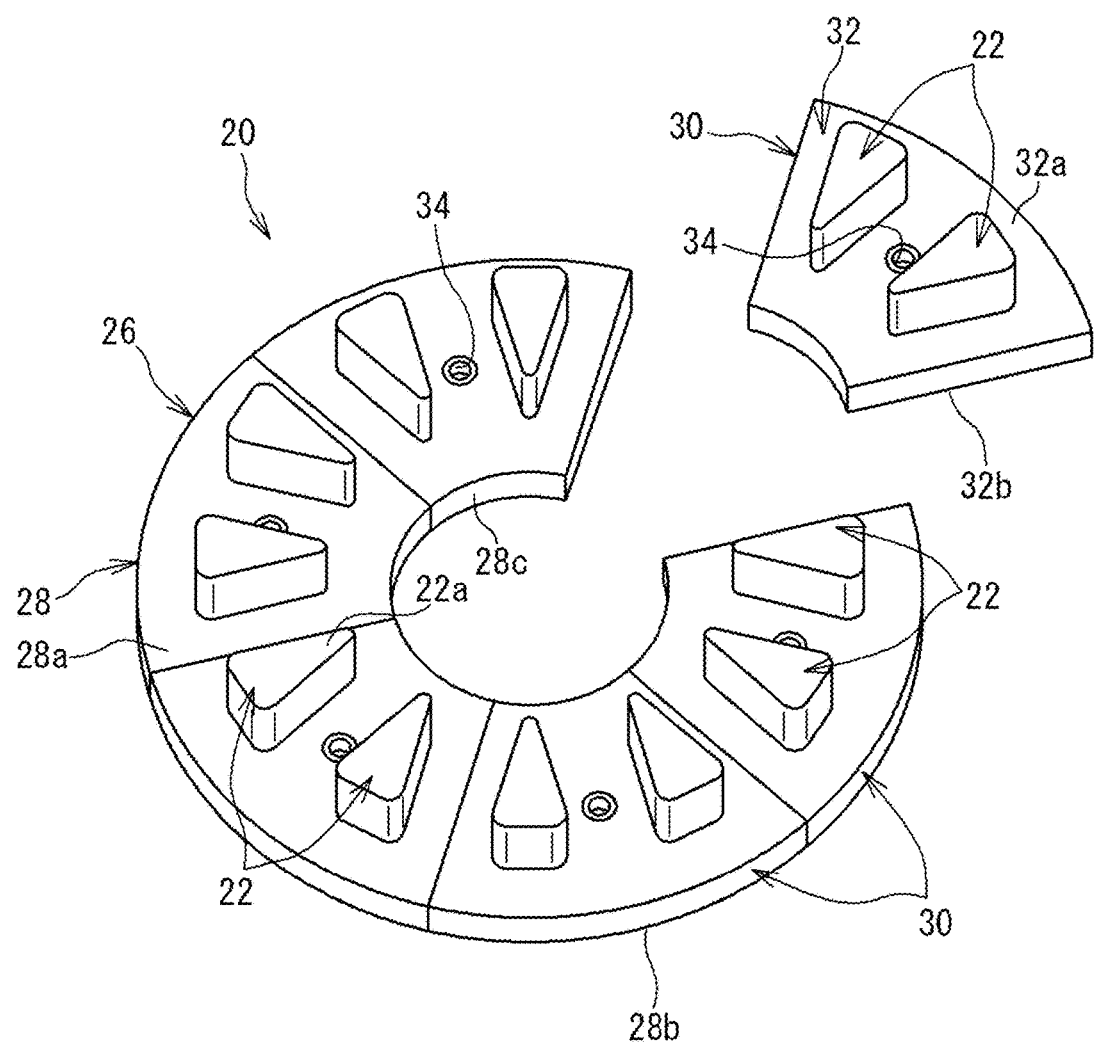
FIG. 3 is an external view showing a stator core according to the first embodiment.

FIG. 3 is an external view showing the stator core 20 according to the first embodiment.

As shown in FIG. 3, the stator core 20 includes an annular body portion 26.

The body portion 26 includes the plurality of tooth portions 22 described above, and a plate-shaped yoke portion 28.

The yoke portion 28 is formed in an annular plate shape having a hole portion 28c through which the rotary shaft is inserted, and has one surface 28a and a back surface 28b on the back side of the one surface 28a, that cross (e.g., perpendicular to) the axial direction. In addition, the plurality of tooth portions 22 are provided on the one surface 28a side so as to protrude.

The body portion 26 is formed in an annular shape by combining a plurality of (in the shown example, six) divisional bodies 30.

Each divisional body 30 has a shape obtained by dividing the annular body portion 26 at equal intervals in the circumferential direction.

One divisional body 30 includes a divisional yoke portion 32 obtained by dividing the annular yoke portion 28 in the circumferential direction, and two tooth portions 22 provided so as to protrude on one surface 32a of the divisional yoke portion 32.

The divisional yoke portions 32 form the yoke portion 28 when the divisional bodies 30 are combined to be the body portion 26. Therefore, the one surfaces 32a of the divisional yoke portions 32 form the one surface 28a of the yoke portion 28. In addition, back surfaces 32b of the divisional yoke portions 32 form the back surface 28b of the yoke portion 28.

The divisional yoke portion 32 has a through hole 34.

The through hole 34 has a circular sectional shape and penetrates from the one surface 32a to the back surface 32b along the axial direction (e.g., in parallel to the axial direction). The through hole 34 is provided between the two tooth portions 22 provided so as to protrude on the divisional yoke portion 32.

One through hole 34 is formed in each divisional yoke portion 32. Therefore, six through holes 34 are provided in the entire stator core 20.

Figure 4A:
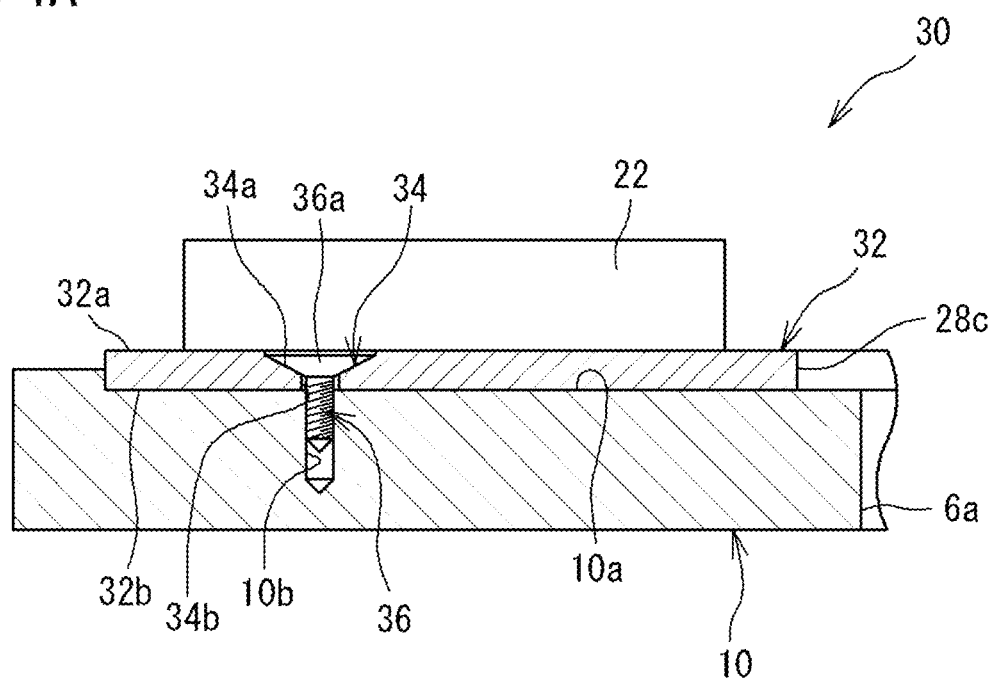
FIG. 4A is a sectional view showing a divisional body in a state of being fixed to a housing.

FIG. 4A is a sectional view showing the divisional body 30 (stator core 20) in a state of being fixed to the housing 6. FIG. 4A shows a cross-section of the divisional body 30 along a plane including the axis S of the axial gap motor 1 and a center line of the through hole 34 (cross-section along the axial direction).

As shown in FIG. 4A, the back surface 32b of the divisional yoke portion 32 contacts an inner surface 10a of the cover 10.

In the through hole 34, a flat head screw 36 is inserted to be screwed to an internal thread 10b provided in the cover 10.

The through hole 34 includes a taper portion 34a that opens on the one surface 32a side, and a straight portion 34b that opens on the back surface 32b side. The taper portion 34a contacts a head portion 36a of the flat head screw 36 and accommodates the head portion 36a within the plate thickness of the divisional yoke portion 32. Thus, in a state in which the flat head screw 36 is screwed to the internal thread 10b, the head portion 36a is prevented from protruding from the one surface 32a.

By bringing the back surface 32b of the divisional yoke portion 32 into contact with the inner surface 10a of the cover 10 and screwing the flat head screw 36 to the internal thread 10b, the divisional body 30 is held between the head portion 36a of the flat head screw 36 and the cover 10 and thus is fixed to the cover 10.

In the present embodiment, in FIG. 4A, the proportion of the sectional area based on the contour of the through hole 34 in the sectional area based on the outer contour of the divisional yoke portion 32 is set to be 50 percent or less.

Figure 4B:
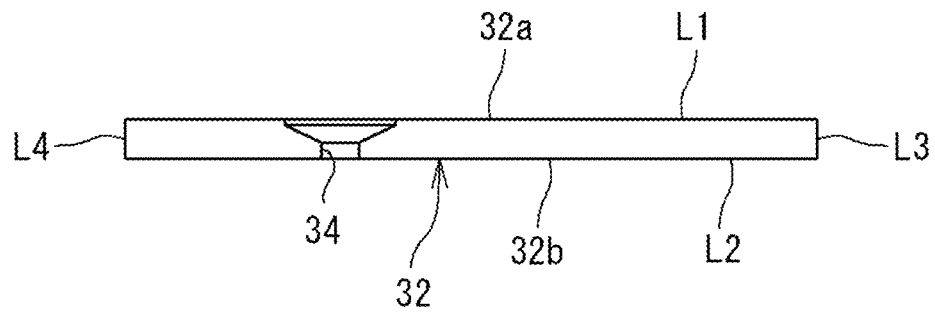
FIG. 4B shows only the outer contour of a divisional yoke portion and the contour of a through hole in FIG. 4A.

FIG. 4B shows only the outer contour of the divisional yoke portion 32 and the contour of the through hole 34 in FIG. 4A.

As shown in FIG. 4B, the outer contour of the divisional yoke portion 32 is a rectangular shape including a contour line L1 on the one surface 32a side, a contour line L2 on the back surface 32b side, a contour line L3 on the radially inner side of the divisional yoke portion 32, and a contour line L4 on the radially outer side.

In the present embodiment, a proportion of the sectional area of the through hole 34 in the rectangular sectional area formed by the contour lines L1, L2, L3, L4 (the sectional area based on the outer contour of the divisional yoke portion 32) is set to be 50 percent or less.

Here, in the divisional yoke portion 32, a magnetic flux flows from one of the two tooth portions 22 to the other one. That is, the divisional yoke portion 32 serves as a magnetic path.

When the through hole 34 is provided in the divisional yoke portion 32, the sectional area of the magnetic path is reduced, so that the flow of the magnetic flux in the divisional yoke portion 32 might be hampered.

In this regard, in the present embodiment, the proportion of the sectional area of the through hole 34 in the sectional area of the divisional yoke portion 32 (yoke portion 28) formed by the contour lines L1, L2, L3, L4 is set to be 50 percent or less. Thus, the sectional area of the magnetic path can be ensured in a minimum necessary amount, whereby hampering of the flow of the magnetic flux can be inhibited.

If the proportion of the sectional area based on the contour of the through hole 34 in the sectional area based on the outer contour of the divisional yoke portion 32 is set to be smaller, a larger sectional area of the magnetic path can be ensured, and thus flow of the magnetic flux in the divisional yoke portion 32 can be appropriately ensured. Therefore, the proportion of the sectional area based on the contour of the through hole 34 in the sectional area based on the outer contour of the divisional yoke portion 32 may be 30 percent or less, or may be 10 percent or less.

The lower limit value of the proportion of the sectional area based on the contour of the through hole 34 is the proportion of the sectional area based on the contour of the through hole 34 when the divisional yoke portion 32 is provided with the through hole 34 into which the flat head screw 36 having the minimum diameter that enables fixation of the stator core 20 can be inserted. More specifically, if the inner diameter of the through hole 34 is 2 mm or greater, the width of the contour of the through hole 34 is 2 mm or greater, and at least a value obtained by multiplying 2 mm by the thickness dimension of the divisional yoke portion 32 is the sectional area based on the contour of the through hole 34. Thus, the proportion of this value to the sectional area based on the outer contour of the divisional yoke portion 32 is the lower limit value.

In a case where a plurality of through holes 34 are present in the outer contour of the divisional yoke portion 32, the sectional area based on the contour of the through hole 34 described above is calculated by summing all the sectional areas based on the contours of the through holes 34 that are present.

In a case where a plurality of through holes 34 are arranged at intervals in the circumferential direction, the sectional area based on the contour of the through hole 34 described above is calculated for each cross-section of the divisional yoke portion 32 along a plurality of planes including the axis S and the center lines of the plurality of through holes 34. The proportion of the sectional area based on the contour of the through hole 34 in each cross-section of the divisional yoke portion 32 along the plurality of planes satisfies the above numerical range condition.

Meanwhile, it is also conceivable that the through hole 34 which might reduce the sectional area of the magnetic path and hamper the flow of the magnetic flux is provided in the tooth portion 22, but in the present embodiment, the through hole 34 is provided in the divisional yoke portion 32 (yoke portion 28), and therefore the flow of the magnetic flux can be appropriately ensured in the tooth portion 22.

The divisional body 30 is formed by a magnetic powder core. The magnetic powder core is a compaction-molded body of soft magnetic powder whose surfaces are coated with insulating films.

Therefore, the body portion 26 formed by combining the divisional bodies 30 is also formed by the magnetic powder core.

The divisional body 30 can be manufactured as follows. That is, as the soft magnetic powder which is the raw material of the magnetic powder core, an Fe—Si based alloy, an Fe—Al based alloy, or the like, as well as pure iron, is used from the standpoint of enhancing consolidation and ensuring the strength.

The process for manufacturing the divisional body 30 includes a step of forming insulating films on soft magnetic powder, a compaction-molding step of filling a mold with the soft magnetic powder having the insulating films formed thereon, and performing compaction-molding thereof, and a step of performing a heat treatment on the compaction-molded green compact at 400 degrees to 800 degrees.

In the compaction-molding step, the relative density of the obtained green compact as compared to the bulk material is set to be 90% or greater. Thus, a sufficient strength can be ensured.

Figure 5:
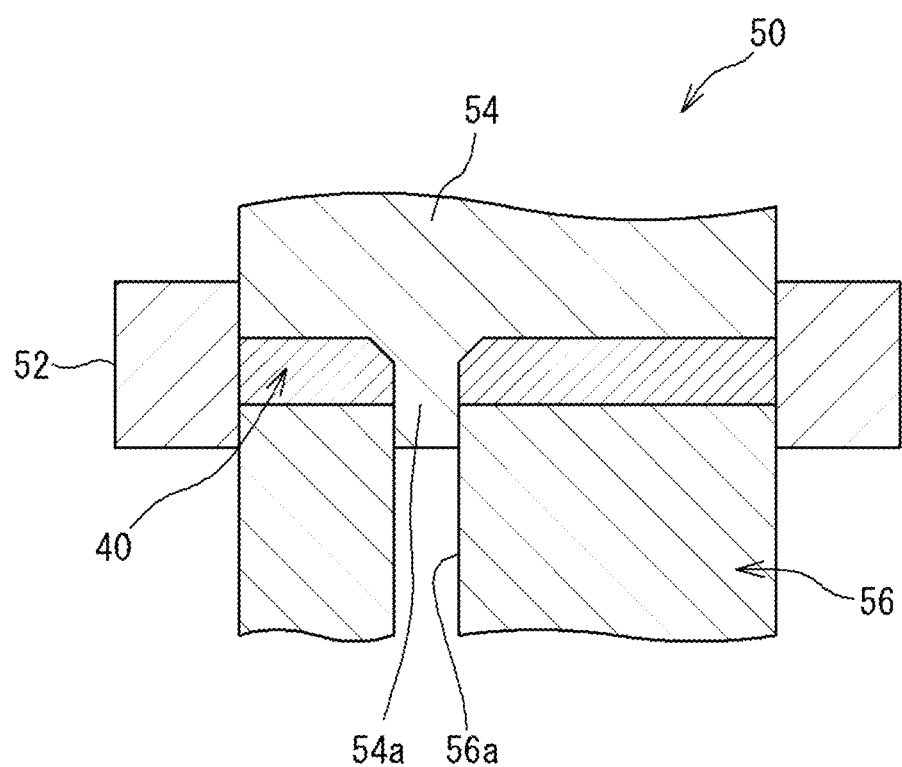
FIG. 5 is a sectional view showing an example of the configuration of a step of compaction-molding soft magnetic powder.

FIG. 5 is a sectional view showing an example of the configuration of the step of compaction-molding soft magnetic powder. FIG. 5 shows a cross-section of a mold 50 used for compaction-molding, at a part corresponding to the through hole 34.

As shown in FIG. 5, the mold 50 used in the step of compaction-molding soft magnetic powder includes a die 52, an upper punch 54, and a lower punch 56. The upper punch 54 is provided with a protrusion 54a for forming the through hole 34. The lower punch 56 is provided with a hole portion 56a for receiving the protrusion 54a.

The outer shape of the protrusion 54a is a shape corresponding to the taper portion 34a and the straight portion 34b of the through hole 34. Thus, a through hole corresponding to the through hole 34 is formed in a green compact 40 obtained by compaction-molding the soft magnetic powder filling the mold 50 by a press machine or the like.

As described above, in the compaction-molding step, the soft magnetic powder is compaction-molded using the mold 50 capable of forming the outer shape of the green compact 40 and the through hole 34.

That is, the mold used in the compaction-molding step is configured to be capable of forming the divisional yoke portion 32 and the two tooth portions 22 of the divisional body 30, and also the through hole 34 provided in the divisional yoke portion 32, by one process.

Therefore, for example, as compared to a case where the divisional yoke portion 32 without the through hole 34 is obtained in the compaction-molding step and then the through hole 34 is formed in the divisional yoke portion 32 by cutting or the like, the step only for forming the through hole 34 is not needed, and thus cost and time required for manufacturing can be reduced.

Here, the mold 50 capable of forming the through hole 34 including the taper portion 34a and the straight portion 34b has been shown. However, a mold capable of forming the through hole 34 provided with a chamfer or a fillet at an outer end, may be used.

In this case, it is possible to form the outer shape of the green compact 40 and the through hole 34 provided with a chamfer or a fillet, at the same time (in the compaction-molding step).

The above chamfer of the through hole 34 is a part having subjected to chamfering work, and for example, chamfering work may be performed at C0.2 mm or greater.

The fillet may be a rounded surface with a radius of 0.5 mm or greater, for example.

As described above, in the present embodiment, the through holes 34 are provided in the divisional bodies 30 forming the body portion 26 of the stator core 20. Therefore, mechanical elements such as bolts, nuts, or the flat head screws 36 can be used for fixing the stator core 20 to the cover 10 of the housing 6. As a result, it becomes possible to fix the stator core 20 to the cover 10 with higher reliability as compared to fixation using an adhesive layer or the like.

Second Embodiment

Figure 6A:
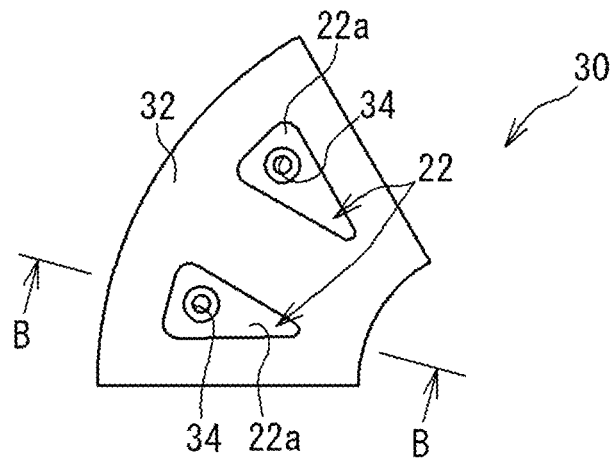
FIG. 6A is a top view showing a divisional body according to the second embodiment.
Figure 6B:
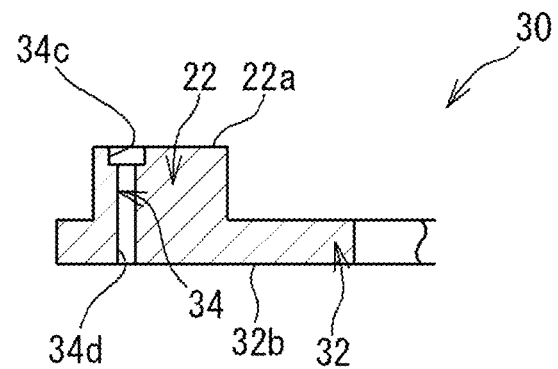
FIG. 6B is a sectional view along line B-B in FIG. 6A.

FIG. 6A is a top view showing a divisional body 30 according to the second embodiment, and FIG. 6B is a sectional view along line B-B in FIG. 6A.

The present embodiment is different from the first embodiment in that the through hole 34 is provided in the tooth portion 22. The other configurations are the same as in the first embodiment and therefore the description thereof is omitted.

The through hole 34 in the present embodiment penetrates from the end surface 22a of the tooth portion 22 to the back surface 32b of the divisional yoke portion 32 along the axial direction (e.g., in parallel to the axial direction).

As shown in FIG. 6B, the through hole 34 includes a large-diameter portion 34c that opens on the end surface 22a side, and a small-diameter portion 34d that opens on the back surface 32b side. The large-diameter portion 34c accommodates a bolt or a nut attached to the through hole 34, within the axial-direction thickness of the tooth portion 22. Thus, when the divisional body 30 is fixed to the housing 6 using a bolt or a nut, the bolt or the nut is prevented from protruding from the end surface 22a.

In the present embodiment, the through hole 34 is provided in the tooth portion 22 having a larger axial-direction thickness than the divisional yoke portion 32. Therefore, reduction in the strength of the divisional body 30 (body portion 26) due to providing the through hole 34 can be inhibited.

In addition, since the through hole 34 which might reduce the sectional area of the magnetic path and hamper the flow of the magnetic flux is provided in the tooth portion 22, the flow of the magnetic flux in the divisional yoke portion 32 can be appropriately ensured.

In the present embodiment, in a cross-section (cross-section along the radial direction) of the tooth portion 22 along a plane crossing (e.g., perpendicular to) the axis S, the proportion of the sectional area based on the contour of the through hole 34 in the sectional area based on the outer contour of the tooth portion 22 is set to be 50 percent or less.

Figure 6C:
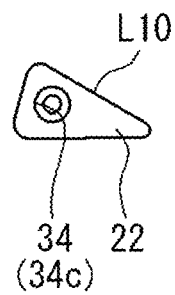
FIG. 6C is a sectional view of a tooth portion provided with a through hole in FIG. 6A and FIG. 6B, along a plane perpendicular to a rotation axis.

FIG. 6C is a sectional view of the tooth portion 22 provided with the through hole 34 in FIG. 6A and FIG. 6B, along a plane perpendicular to the rotation axis, and shows only the outer contour of the tooth portion 22 and the contour of the through hole 34.

As shown in FIG. 6C, the outer contour of the tooth portion 22 is represented by a contour line L10 having an almost triangular shape.

In the present embodiment, the proportion of the sectional area based on the contour of the through hole 34 in the sectional area of a range enclosed by the contour line L10 (the sectional area based on the outer contour of the tooth portion 22) is set to be 50 percent or less. Here, the through hole 34 includes the large-diameter portion 34c and the small-diameter portion 34d. The sectional area of the through hole 34 is calculated on the basis of the contour of the large-diameter portion 34c having a larger sectional area.

Here, a magnetic flux flows in the tooth portion 22 along the axial direction. That is, the tooth portion 22 serves as a magnetic path.

When the through hole 34 is provided in the tooth portion 22, the sectional area of the magnetic path is reduced, so that the flow of the magnetic flux in the tooth portion 22 might be hampered.

In this regard, in the present embodiment, the proportion of the sectional area of the through hole 34 in the sectional area of the tooth portion 22 formed by the contour line L10 is set to be 50 percent or less. Thus, the sectional area of the magnetic path can be ensured in a minimum necessary amount, whereby hampering of the flow of the magnetic flux can be inhibited.

If the proportion of the sectional area based on the contour of the through hole 34 in the sectional area based on the outer contour of the tooth portion 22 is set to be smaller, a larger sectional area of the magnetic path can be ensured, and thus flow of the magnetic flux in the tooth portion 22 can be appropriately ensured. Therefore, the proportion of the sectional area based on the contour of the through hole 34 in the sectional area based on the outer contour of the tooth portion 22 may be 30 percent or less, or may be 10 percent or less.

The lower limit value of the proportion of the sectional area based on the contour of the through hole 34 is the proportion of the section area based on the contour of the through hole 34 when the tooth portion 22 is provided with the through hole 34 into which a bolt having the minimum diameter that enables fixation of the stator core 20 can be inserted. More specifically, if the inner diameter (minimum diameter) of the through hole 34 is 2 mm or greater, the sectional area based on the contour of the through hole 34 is at least $1^2 \times 3.14 \approx 3.14$ mm$^2$ or greater. Thus, the proportion of this value to the sectional area based on the outer contour of the tooth portion 22 is the lower limit value.

In a case where a plurality of through holes 34 are present in the outer contour of the tooth portion 22, the sectional area based on the contour of the through hole 34 described above is calculated by summing all the sectional areas based on the contours of the through holes 34 that are present.

Third Embodiment

Figure 7A:
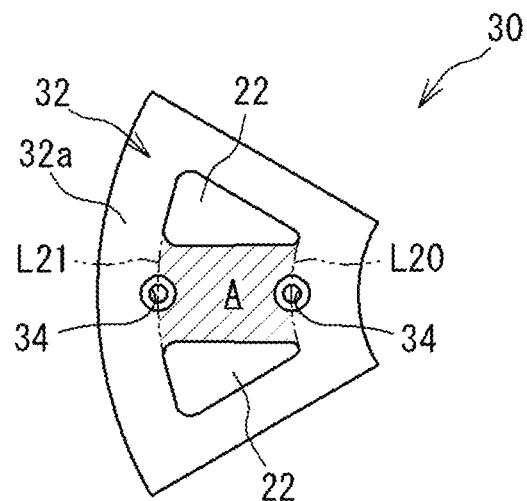
FIG. 7A is a top view showing a divisional body according to the third embodiment.

FIG. 7A is a top view showing a divisional body 30 according to the third embodiment.

The present embodiment is different from the first embodiment in that two through holes 34 are provided in the divisional yoke portion 32, and when the one surface 32a of the divisional yoke portion 32 is viewed straightly from the axial direction, parts of the through holes 34 are located outside an area A between a pair of the tooth portions 22 arranged adjacently to each other. The other configurations are the same as in the first embodiment and therefore the description thereof is omitted.

As shown in FIG. 7A, on the one surface 32a, the area A is defined between the pair of tooth portions 22 arranged adjacently to each other.

The area A is an area enclosed by the pair of tooth portions 22, an arc line L20 connecting the radially inner vertices of the pair of tooth portions 22, and an arc line L21 connecting the radially outer ends of the pair of tooth portions 22.

As shown in FIG. 7A, both through holes 34 are partially located outside the area A.

Here, as described above, a magnetic flux flows in the divisional yoke portion 32 from one of the two tooth portions 22 to the other one. In particular, the area A of the divisional yoke portion 32 is between the pair of tooth portions 22 adjacent to each other and therefore the magnetic flux flowing between the tooth portions 22 significantly passes in the area A of the divisional yoke portion 32.

In the present embodiment, since parts of the through holes 34 are located outside the area A, the through holes 34 are located at the radial end sides of the area A on the divisional yoke portion 32 (yoke portion 28). Therefore, it is possible to inhibit the through holes 34 from hampering the flow of the magnetic flux passing through the area between the pair of tooth portions 22 in the divisional yoke portion 32, as compared to a case where the through holes 34 are located at a center part in the area A, for example.

Figure 7B:
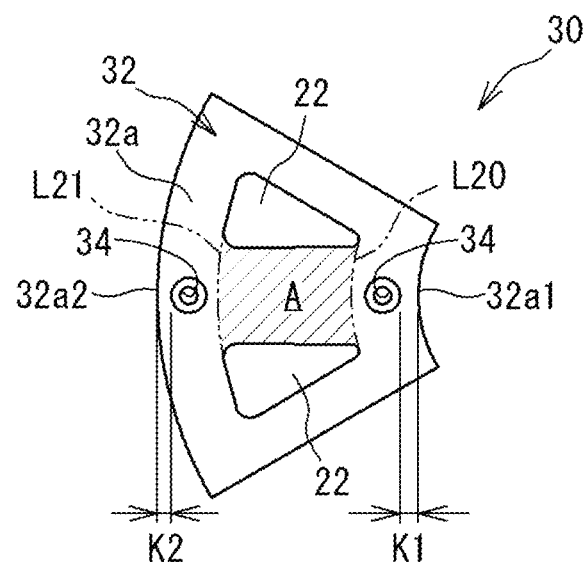
FIG. 7B is a top view showing a divisional body according to a modification of the third embodiment.

FIG. 7B is a top view showing a divisional body 30 according to a modification of the third embodiment.

In this modification, two through holes provided in the divisional yoke portion 32 are located outside the area A.

Also in this case, as in the above third embodiment, it is possible to inhibit the through holes 34 from hampering the flow of the magnetic flux passing through the area between the pair of tooth portions 22 in the divisional yoke portion 32.

In this modification, the through holes 34 are close to a small-diameter-side edge 32a1 and a large-diameter-side edge 32a2 of the one surface 32a. A distance K1 between the through hole 34 and the small-diameter-side edge 32a1, and a distance K2 between the through hole 34 and the large-diameter-side edge 32a2, may be 0.5 millimeters or greater. If the distances K1, K2 are smaller than 0.5 millimeters, there is a possibility that filling with soft magnetic powder is not sufficiently performed in compaction-molding and thus molding failure occurs, and also there is a possibility that the strength of the molded product is reduced. Therefore, the distances K1, K2 may be 0.5 millimeters or greater. Further, the distances K1, K2 may be 1.0 millimeters or greater. In this case, filling with soft magnetic powder can be appropriately performed and molding failure can be effectively inhibited, and also, an appropriate strength can be obtained.

Fourth Embodiment

Figure 8:
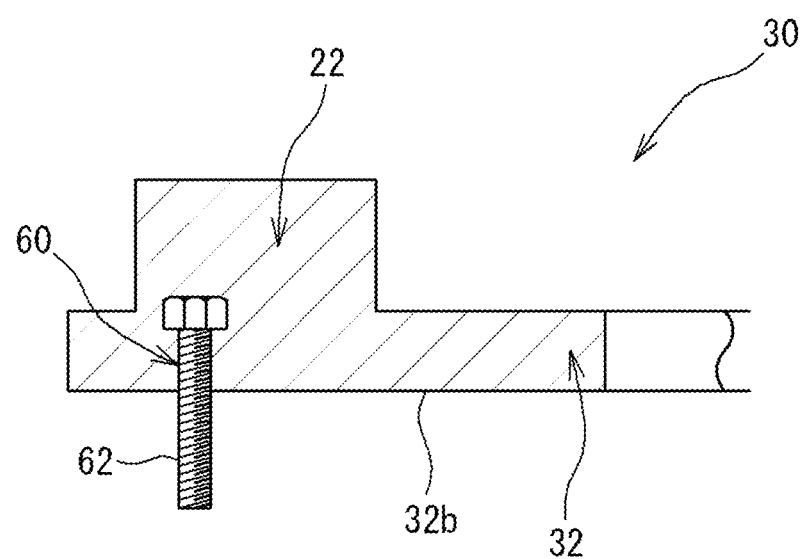
FIG. 8 is a sectional view of a divisional body according to the fourth embodiment.

FIG. 8 is a sectional view of a divisional body 30 according to the fourth embodiment.

The present embodiment is different from the above embodiments in that a bolt 60 is fixed to the divisional body.

As shown in FIG. 8, a screw portion 62 of the bolt 60 protrudes from the back surface 32b of the divisional yoke portion 32.

A head portion 64 and a part of the screw portion 62 of the bolt 60 are embedded in the divisional body 30 (body portion 26). The bolt 60 is fixed to the divisional body 30 by the head portion 64 being embedded in the divisional body 30.

The screw portion 62 protruding and exposed from the back surface 32b is, for example, inserted into a hole provided in the cover 10 of the housing 6, and a nut or the like for fixing the divisional body 30 to the housing 6 is screwed thereto. Thus, the divisional body 30 is fixed to the housing 6.

In the present embodiment, since the bolt 60 is fixed to the divisional body 30, a mechanical element such as a nut can be screwed to the screw portion 62 of the bolt 60, to fix the stator core 20 to the cover 10 of the housing 6. As a result, it becomes possible to fix the stator core 20 to the cover 10 with higher reliability as compared to fixation using an adhesive layer or the like.

[Others]

The embodiments disclosed here are merely illustrative in all aspects and should not be recognized as being restrictive.

For example, in the above embodiments, the case where the stator core 20 having the through holes 34 is applied to an axial gap motor as a rotating electric machine, has been shown. However, the stator core 20 may be used for an axial-gap-type power generator.

In the above embodiments, the case of using an axial gap motor having a double-stator structure has been shown. However, the above is applicable also to an axial gap motor having a single-stator structure.

In the above embodiments, the case where the body portion 26 of the stator core 20 is formed by combining six divisional bodies 30 has been shown. However, the body portion 26 may be integrally formed.

In the above embodiments, the case where the through hole 34 is formed together with the divisional yoke portion 32 and the tooth portions 22 through molding by a mold in the compaction-molding step, has been shown. However, the through hole 34 may be formed by a method other than molding by a mold, e.g., cutting.

In the above embodiments, the case where the stator core 20 is fixed to the housing 6 using the through holes 34 has been shown. However, in accordance with the usage condition of the axial gap motor 1, the stator core 20 may be fixed to a surrounding member of the axial gap motor 1, e.g., may be directly fixed to a member of an apparatus into which the axial gap motor 1 is incorporated.

In the above embodiments, the case where the through hole 34 has a circular sectional shape has been shown. However, without limitation thereto, for example, the through hole 34 may have a polygonal sectional shape such as a quadrangular sectional shape or a pentagonal sectional shape.

In the second embodiment, the case where the through hole 34 includes the large-diameter portion 34c that opens on the end surface 22a side, and the small-diameter portion 34d that opens on the back surface 32b side, has been shown. The through hole 34 may be formed to be a stepped hole in at least one of both ends thereof. For example, large-diameter portions may be provided at both ends of the through hole 34. In this case, the large-diameter portions provided at both ends are connected by a small-diameter portion.

Further, the through hole 34 may include a large-diameter portion that opens on the back surface 32b side, and a small-diameter portion that opens on the end surface side.

When at least one of both ends of the through hole 34 is formed to be a stepped hole, a head portion of a bolt, a nut, or the like used for fixing the stator core 20 can be accommodated in the through hole 34 and thus can be inhibited from protruding.

In the first embodiment, the case where the through hole 34 has the taper portion 34a and the straight portion 34b has been shown. However, the through hole 34 may have a taper surface over the entire range in the axial direction.

The scope of the present disclosure is defined by the scope of the claims rather than by the description above, and is intended to include meaning equivalent to the scope of the claims and all modifications within the scope.

REFERENCE SIGNS LIST 1 axial gap motor
2 rotor
2a one surface
2b other surface
2c hole portion
4 stator
6 housing
6a hole portion
8 magnet
8a one surface
8b other surface
9 holding member
10 cover
10a inner surface
10b internal thread
20 stator core
22 tooth portion
22a end surface
24 coil
26 body portion
28 yoke portion
28a one surface
28b back surface
28c hole portion
30 divisional body
32 divisional yoke portion
32a one surface
32b back surface
32a1 small-diameter-side edge
32a2 large-diameter-side edge
34 through hole
34a taper portion
34b straight portion
34c large-diameter portion
34d small-diameter portion
36 flat head screw
36a head portion
40 green compact
50 mold
52 die
54 upper punch
54a protrusion
56 lower punch
56a hole portion
60 bolt
62 screw portion
64 head portion
K1 distance
K2 distance
L1 contour line
L2 contour line
L3 contour line
L4 contour line
L10 contour line
L20 arc line
L21 arc line
S axis

The invention claimed is:

1. A stator core for a rotating electric machine of an axial gap type, the stator core comprising:
a body portion formed by a compaction-molded body of soft magnetic powder whose surfaces are coated with insulating films, wherein
the body portion is provided with one or a plurality of through holes,
the body portion includes
a plate-shaped yoke having one surface and a back surface crossing an axial direction of the rotating electric machine, and
a plurality of tooth portions protruding along the axial direction from the one surface,
the one or plurality of through holes penetrate along the axial direction from the one surface to the back surface,
the plurality of tooth portions are arranged at predetermined intervals along a circumferential direction, and
when the one surface is viewed straightly from the axial direction, a part of the one through hole or each of the plurality of through holes is located in an area between a pair of the tooth portions arranged adjacently to each other among the plurality of tooth portions on the one surface.

2. The stator core according to claim 1, wherein the body portion includes
a plate-shaped yoke having one surface and a back surface crossing an axial direction of the rotating electric machine, and
a plurality of tooth portions protruding along the axial direction from the one surface, and
the one or plurality of through holes penetrate along the axial direction from end surfaces of the plurality of tooth portions to the back surface.

3. The stator core according to claim 1, wherein the through hole has a circular sectional shape or a polygonal sectional shape.

4. The stator core according to claim 1, wherein at least one of both ends of the through hole is formed to be a stepped hole.

5. The stator core according to claim 1, wherein the through hole is formed to be a tapered hole.

6. A rotating electric machine of an axial gap type, comprising the stator core according to claim 1.

7. A stator core-for a rotating electric machine of an axial gap type, the stator core comprising:
a body portion formed by a compaction-molded body of soft magnetic powder whose surfaces are coated with insulating films, wherein
the body portion is provided with one or a plurality of through holes,
the body portion includes
a plate-shaped yoke having one surface and a back surface crossing an axial direction of the rotating electric machine, and
a plurality of tooth portions protruding along the axial direction from the one surface, the one or plurality of through holes penetrate along the axial direction from the one surface to the back surface, and in a cross-section of the yoke along one plane or each of a plurality of planes including an axis of the rotating electric machine and a center line of the one or plurality of through holes, a proportion of a sectional area based on a contour of the one or plurality of through holes in a sectional area based on an outer contour of the yoke is 50 percent or less.

8. A stator core for a rotating electric machine of an axial gap type, the stator core comprising:

a body portion formed by a compaction-molded body of soft magnetic powder whose surfaces are coated with insulating films, wherein the body portion is provided with one or a plurality of through holes, the body portion includes a plate-shaped yoke having one surface and a back surface crossing an axial direction of the rotating electric machine, and a plurality of tooth portions protruding along the axial direction from the one surface, the one or plurality of through holes penetrate along the axial direction from end surfaces of the plurality of tooth portions to the back surface, and in a cross-section of each tooth portion along a plane crossing an axis of the rotating electric machine, a proportion of a sectional area based on a contour of the one or plurality of through holes in a sectional area based on an outer contour of the tooth portion provided with the one or plurality of through holes is 50 percent or less.

* * * * *